US009938888B2

(12) United States Patent
Huang et al.

(10) Patent No.: US 9,938,888 B2
(45) Date of Patent: Apr. 10, 2018

(54) COMBUSTION SYSTEM FOR GASEOUS FUELED INTERNAL COMBUSTION ENGINE

(71) Applicant: Westport Power Inc., Vancouver (CA)

(72) Inventors: Jian Huang, Surrey (CA); Dale W. Goudie, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 7 days.

(21) Appl. No.: 14/916,952

(22) PCT Filed: Aug. 27, 2014

(86) PCT No.: PCT/CA2014/050819
§ 371 (c)(1),
(2) Date: Mar. 4, 2016

(87) PCT Pub. No.: WO2015/031991
PCT Pub. Date: Mar. 12, 2015

(65) Prior Publication Data
US 2016/0348571 A1    Dec. 1, 2016

(30) Foreign Application Priority Data
Sep. 6, 2013    (CA) ...................................... 2826435

(51) Int. Cl.
*F02B 23/06*    (2006.01)
*F02B 43/00*    (2006.01)
(Continued)

(52) U.S. Cl.
CPC ...... *F02B 23/0624* (2013.01); *F02B 23/0651* (2013.01); *F02B 23/0663* (2013.01);
(Continued)

(58) Field of Classification Search
CPC .. F02D 19/10; F02D 19/0694; F02D 41/0025; F02D 41/3047; F02D 41/402;
(Continued)

(56) References Cited

U.S. PATENT DOCUMENTS 4,883,032 A * 11/1989 Hunter ...................... F02B 3/06
                                                                      123/256
5,775,288 A *  7/1998 Suzuki .................. F02B 23/104
                                                                      123/298
(Continued)

FOREIGN PATENT DOCUMENTS

CA    2 406 297 A1    4/2004
CA    2 743 043 C    9/2012
(Continued)

OTHER PUBLICATIONS

International Search Report dated Nov. 12, 2014, for corresponding International Application No. PCT/CA2014/050819 filed on Aug. 27, 2014, 3 pages.
(Continued)

*Primary Examiner* — Long T Tran
(74) *Attorney, Agent, or Firm* — Seed IP Law Group LLP (57) ABSTRACT

Gaseous fuel injection pressures are normally less than liquid fuel injection pressures, resulting in reduced gaseous fuel jet momentum and mixing. A combustion system for an internal combustion engine comprises an intake port and valve, a cylinder and a piston that cooperate to provide a quiescent combustion chamber. The piston includes a re-entrant type piston bowl comprising an outer periphery and a protuberance emanating from the outer periphery. A fuel injector is configured to directly introduce a gaseous fuel into the combustion chamber and an ignition source is provided for igniting the gaseous fuel. A controller actuates the fuel injector such that a gaseous fuel jet is directed towards and splits upon impacting the protuberance forming
(Continued)

first and second fuel plumes. The first fuel plume is redirected towards a first mixing zone adjacent a cylinder head and the second fuel plume redirected towards a second mixing zone adjacent the piston bowl.

20 Claims, 4 Drawing Sheets (51) Int. Cl.
    *F02B 23/10*     (2006.01)
    *F02M 21/02*     (2006.01)
    *F02D 19/06*     (2006.01)
    *F02D 19/10*     (2006.01)

(52) U.S. Cl.
    CPC ...... *F02B 23/0672* (2013.01); *F02B 23/0693* (2013.01); *F02B 23/101* (2013.01); *F02B 43/00* (2013.01); *F02D 19/0686* (2013.01); *F02D 19/0694* (2013.01); *F02D 19/10* (2013.01); *F02M 21/0263* (2013.01); *F02M 21/0275* (2013.01); *F02M 21/0284* (2013.01); *F02B 23/0669* (2013.01); *Y02T 10/125* (2013.01); *Y02T 10/32* (2013.01); *Y02T 10/36* (2013.01)

(58) Field of Classification Search
    CPC .. F02D 19/0686; F02B 7/06; F02B 2043/103; F02B 23/0624; F02B 23/0651; F02B 23/0672; F02B 23/0693; F02B 23/101
    See application file for complete search history.

(56) References Cited

U.S. PATENT DOCUMENTS

| | | | | |
|---|---|---|---|---|
| 5,908,018 A * | 6/1999 | Suzuki | ................. | F02B 23/104 123/301 |
| 6,439,192 B1 * | 8/2002 | Ouellette | ................. | F02D 19/10 123/299 |
| 6,854,438 B2 * | 2/2005 | Hilger | ................. | F02B 23/0639 123/143 B |
| 7,281,514 B2 * | 10/2007 | Hill | ................. | F02B 23/0651 123/298 |
| 7,431,012 B1 | 10/2008 | Glenn et al. | | |
| 7,438,039 B2 | 10/2008 | Poola et al. | | |
| 8,322,325 B2 * | 12/2012 | Rogak | ................. | F02D 19/0647 123/304 |
| 2007/0023005 A1 | 2/2007 | Chmela | | |
| 2009/0025675 A1 | 1/2009 | Ilkubo et al. | | |
| 2011/0023819 A1 * | 2/2011 | Ives | ................. | F02B 23/0651 123/298 |
| 2011/0083638 A1 | 4/2011 | Stovell | | |
| 2011/0253094 A1 | 10/2011 | Rothbauer et al. | | |
| 2012/0325180 A1 * | 12/2012 | Montgomery | ........ | F02D 41/403 123/299 |
| 2013/0019838 A1 * | 1/2013 | Lee | ................. | F02B 23/0651 123/298 |
| 2014/0048036 A1 | 2/2014 | Zoeller et al. | | |
| 2014/0305402 A1 | 10/2014 | Zoeller et al. | | |

FOREIGN PATENT DOCUMENTS

| | | |
|---|---|---|
| DE | 10 2011 017 479 A1 | 10/2012 |
| DE | 10 2011 119 215 A1 | 5/2013 |
| WO | 2004031572 A1 | 4/2004 |
| WO | 2007/056845 A1 | 5/2007 |
| WO | 2013/116941 A1 | 8/2013 |

OTHER PUBLICATIONS

Notification of Transmittal of International Preliminary Report on Patentability dated Jul. 31, 2015, for corresponding International Application No. PCT/CA2014/050819 filed on Aug. 27, 2014, 11 pages.
Canadian Office Action dated Jan. 14, 2014, for corresponding Canadian patent application No. 2,826,435, 4 pages.
Canadian Office Action dated May 7, 2014, for corresponding Canadian patent application No. 2,826,435, 4 pages.
Canadian Office Action dated Oct. 31, 2014, for corresponding Canadian patent application No. 2,826,435, 6 pages.
Canadian Office Action dated Mar. 26, 2015, for corresponding Canadian patent application No. 2,826,435, 4 pages.

* cited by examiner

Prior Art

COMBUSTION SYSTEM FOR GASEOUS FUELED INTERNAL COMBUSTION ENGINE

BACKGROUND

Technical Field

The present application relates to a technique of directly introducing and mixing a gaseous fuel in a combustion chamber of an internal combustion engine.

Description of the Related Art

Automobile manufacturers and fuel system integrators continuously advance engine design to improve performance and emissions. Some of the greatest advancements resulted from the evolution of fuel injection systems, for example improvements in fuel metering, injection timing and fuel injection pressure. These advancements in fuel injection systems refined combustion control, such as ignition timing, combustion phasing and heat release rates, resulting in increased efficiencies and reduced emissions. More attention is being directed towards other aspects of engine design to further improve engine performance. The design of the piston bowl has received considerable attention since it is directly related to combustion performance, which impacts both engine efficiency and emissions.

It is known to use what are called re-entrant piston bowls in compression ignition engines that are fueled with diesel and employ swirl in the air charge. Cummins Inc. developed one such re-entrant piston bowl during the late 1990s for an engine fueled with diesel. The Applicant developed a natural gas fueling system for a Cummins® ISX diesel engine employing this piston bowl. As in the diesel fueled engine, the ISX engine fueled with natural gas employed swirl to improve mixing of fuel with the air charge, which improved combustion performance.

Modern day liquid fuel injection pressures can be as high as 1000 MPa and a typical common rail diesel fuel injection pressure can be around 250 MPa. Cryogenic gaseous fuel systems pressurize gas by pumping a cryogenic liquid. There are challenges with hardware durability and cost in pressurizing a gaseous fuel to as high a pressure as these liquid fuel injection pressures. At these liquid fuel injection pressures, mechanical components such as fittings and hoses enter into different classifications and become very expensive. It is not economically feasible for a gaseous fuel to have the same injection pressure as modern day liquid fuel systems. For this reason gaseous fuel injection pressure is much less than that employed for liquid fuels, and gaseous fuel is normally injected at a pressure sufficient mainly to achieve a desired differential pressure between fuel pressure and in-cylinder pressure at the time of injection to achieve the desired amount of fuel to be introduced within the desired amount of time. There can be an order of magnitude difference in injection pressure between liquid and gaseous fuels. In this disclosure a gaseous fuel is defined as any fuel that is in a gas state at standard temperature and pressure. Examples of such gaseous fuels comprise butane, ethane, hydrogen, methane, propane, natural gas and mixtures of these fuels, among others.

The atomization and overall mixing of liquid fuels inside the cylinder improves as injection pressure increases. With the high injection pressures now being employed, the use of swirl of the air charge in the cylinder is not required to achieve the desired levels of mixing. For this reason so called quiescent combustion chambers are being employed which minimize and preferably eliminate swirl of the air charge. This has the benefit of improving overall engine efficiency since less compression heat in the air charge is transferred to the cylinder walls and is instead being transformed into mechanical energy used to drive the piston downwards during the power stroke. It is also more efficient because there is less restriction in the charge flow system; referred to sometimes as "better breathing". That is, the convective transfer of energy from the air charge to the cylinder walls is reduced when the kinetic energy (swirl) of the air charge is reduced.

Figure 1:
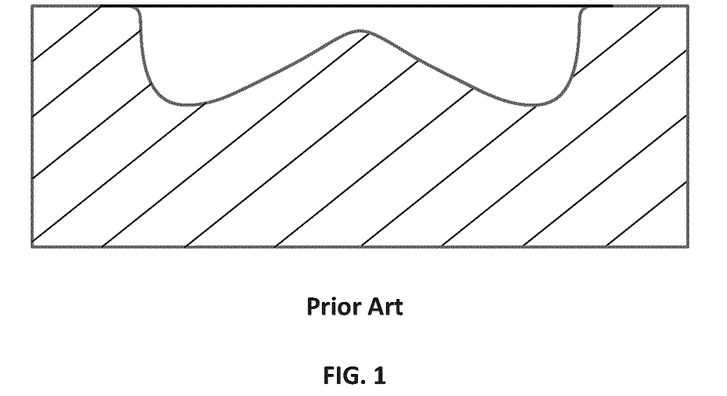
FIG. 1 is a cross-sectional schematic view of a prior art omega piston bowl.

For liquid fueled engines designed to operate with quiescent combustion chambers and high injection pressure it is known to employ a piston bowl shape such as the one as illustrated in FIG. 1, known as and referred to herein as an "omega" piston bowl. In many applications, the required level of fuel-air mixing in the combustion chamber is achieved as a result of the high injection pressure. This allows a simplified piston bowl shape to be employed, such as an omega piston bowl. Compared to re-entrant type piston bowls, which have special features for a variety of reasons, omega piston bowls are relatively less expensive to manufacture.

Liquid fuel jets behave differently inside the combustion chamber, and have a different in-cylinder life cycle, compared to gaseous fuel jets. As a liquid fuel jet penetrates into the combustion chamber from the fuel injection nozzle the liquid fuel around the outer surface of the jet entrains air and atomizes due to the heat of compression. The high injection pressure imparts the jet with a high injection velocity and momentum. The large momentum causes substantial turbulence around the jet's outer surface that enhances entrainment of air. Due to the high momentum, the penetration distance of the jet into the combustion chamber is large, which allows the liquid fuel to mix with a large amount of air within the combustion chamber. The spray pattern of liquid fuel jets resembles that of a cone.

A gaseous fuel jet expands rapidly upon entering the combustion chamber, due to it being a gas and the relatively lower differential between gaseous fuel pressure and in-cylinder pressure. As a result a large plume develops immediately adjacent the injection nozzle. Depending upon the gaseous fuel jet injection angle, it is possible that the top of the plume can interact with the cylinder head which acts to decrease the momentum of the gaseous fuel jet as a whole and to draw the plume upwards towards the cylinder head. The gaseous fuel jet has much less momentum compared to the liquid fuel jet due to the relative densities of gaseous and liquid fuels. As a result the gaseous fuel jet penetration distance into the combustion chamber is less than that of the liquid fuel. On a mass equivalent basis gaseous fuel jets interact with less air inside the combustion chamber compared to liquid fuel jets. In order to enhance the mixing of gaseous fuel with air inside the combustion chamber it is common to employ techniques such as swirl, however, as previously noted, this reduces the efficiency since compression heat is lost to the cylinder walls through convection of the air charge.

U.S. Pat. No. 7,438,039, issued Oct. 21, 2008 to Poola et al., hereinafter the Poola reference, discloses a large-bore, medium-speed diesel engine having a piston crown bowl with an acute re-entrant angle. The acute re-entrant angle crown bowl is provided in the piston crown to improve performance and emissions characteristics. A large bore is defined as one within a diameter range between 180 mm to 600 mm. Poola teaches that as diesel engine bore size decreases, for example in engines with a bore diameter less than 180 mm, increasing amounts of air swirl are used to achieve faster fuel-air mixing rates.

U.S. Pat. No. 7,431,012, issued Oct. 7, 2008 to Glenn et al., hereinafter the Glenn reference, discloses a diesel combustion system with a re-entrant piston bowl. The bore diameter is approximately 250 mm, which is suitable for use in a large engine such as a locomotive. Fuel tangentially impinges a midland portion of a piston bowl floor, permitting some quenching of the combustion, lowering the peak reaction temperature, and consequently reducing the formation of nitrous oxides (NOx).

There is no discussion in Poola or Glenn of the challenges associated with introducing, mixing and combusting gaseous fuels in internal combustion engines. The state of the art is lacking in techniques for directly introducing and mixing a gaseous fuel in a combustion chamber of an internal combustion engine.

BRIEF SUMMARY

An improved method for combusting a gaseous fuel in a combustion chamber of an internal combustion engine comprises introducing an intake charge into the combustion chamber with a swirl number within a range of 0 to 0.5; introducing a gaseous fuel jet directly into the combustion chamber; igniting the gaseous fuel; splitting the gaseous fuel jet into at least a first fuel plume and a second fuel plume; redirecting the first fuel plume towards a first mixing zone adjacent a cylinder head; and redirecting the second fuel plume towards a second mixing zone adjacent a piston bowl. In a preferred embodiment the gaseous fuel jet is split and redirected towards the first and second mixing zones when introduced under high load conditions, and under light load conditions the method further comprises introducing the gaseous fuel jet and guiding the gaseous fuel jet towards the second mixing zone. The gaseous fuel can be selected from the list containing biogas, butane, ethane, hydrogen, methane, propane, natural gas and mixtures of these fuels. An injection angle of the gaseous fuel jet comprises a correction angle to compensate for the hydrodynamic effect of boundary layer flow between the gaseous fuel jet and a fire deck of the combustion chamber such that the gaseous fuel jet impacts a splitting feature within a predetermined range of tolerance. The effect of the correction angle is to design the fuel injector with a larger injection angle than that which would be used by a liquid fuel injector in a liquid fueled engine with the same geometry and design.

In a preferred embodiment, the method comprises introducing a pilot fuel jet directly into the combustion chamber whereby the pilot fuel jet compression ignites thereby igniting the gaseous fuel. The timing of pilot fuel introduction into the combustion chamber can be before gaseous fuel introduction. A pilot fuel injection angle is less than a gaseous fuel injection angle since the hydrodynamic effect of boundary layer flow is less influential on the pilot fuel which is typically a liquid fuel such as diesel. Under certain operating conditions the internal combustion engine will only be fueled with the pilot fuel. Under these conditions the method further comprises introducing a pilot fuel jet directly into the combustion chamber; splitting the pilot fuel jet into at least a first pilot fuel plume and a second pilot fuel plume; redirecting the first pilot fuel plume towards the first mixing zone; redirecting the second fuel plume towards the second mixing zone; and compression igniting the first and second pilot fuel plumes.

In another preferred embodiment a positive ignition source ignites the gaseous fuel instead of employing a pilot fuel. For single pulse injections the gaseous fuel jet is split when the piston position, measured by a reference crank angle degree, is between a range of 15° before top dead center during a compression stroke and 15° after top dead center during a power stroke. When multiple gaseous fuel injections are performed in a single engine cycle (that is during a single compression and/or power stroke) the gaseous fuel jet can be split when the piston is between a range of 30° before top dead center during a compression stroke and 30° after top dead center during a power stroke. Multiple injections are advantageous during high fueling conditions, where a first injection is performed such that it is primarily directed towards the first mixing zone, and a second injection is performed (after the first injection) such that is primarily directed towards the second mixing zone. The timing of the first and second injections can be adjusted to control the equivalence ratios within the first and second mixing zones as a function of engine operating conditions.

An improved combustion system for an internal combustion engine comprises a quiescent combustion chamber. The combustion chamber is defined in part by a cylinder wall and a cylinder head. A piston reciprocating within the cylinder wall further defines the combustion chamber and comprises a re-entrant piston bowl. The re-entrant piston bowl comprises an outer periphery and a protuberance emanating from the outer periphery. An intake valve allows selective communication of an intake charge from an intake port to the combustion chamber. The intake port, the intake valve and the piston cooperate to introduce the intake charge quiescently into the combustion chamber with a swirl number within a range of 0 to 0.5. A fuel injector is configured to directly introduce a gaseous fuel into the combustion chamber and an ignition source is provided for igniting the gaseous fuel. A controller is operatively connected with the fuel injector and programmed to actuate the fuel injector to introduce the gaseous fuel into the combustion chamber. A gaseous fuel jet emanating from the fuel injector ignites and is directed towards and splits upon impacting the protuberance forming at least a first fuel plume and a second fuel plume. The first fuel plume is redirected towards a first mixing zone adjacent the cylinder head and the second fuel plume redirected towards a second mixing zone adjacent the piston bowl. In a preferred embodiment, the gaseous fuel jet is split and redirected towards the first and second mixing zones when introduced under high load conditions, and the controller is further programmed to introduce the gaseous fuel jet under light loads conditions such that the gaseous fuel jet is guided by the protuberance towards the second mixing zone to reduce over-leaning the mixture.

The fuel injector is configured to introduce the gaseous fuel jet at an injection angle comprising a correction angle to compensate for the hydrodynamic effect of boundary layer flow between the gaseous fuel jet and a fire deck of the combustion chamber such that the gaseous fuel jet impacts a splitting feature within a predetermined range of tolerance. The fuel injector can be a concentric needle fuel injector configured to introduce the gaseous fuel and a pilot fuel. In a preferred embodiment, the start of injection timing for the pilot fuel is earlier than start of injection timing for the gaseous fuel, and a gaseous fuel jet injection angle is greater than a pilot fuel jet injection angle.

The controller can be further programmed to introduce only the pilot fuel into the combustion chamber when at least one of (1) the gaseous fuel pressure drops below a predetermined value and (2) a quantity of gaseous fuel drops below a predetermined value, such that the internal combustion engine is fueled with only the pilot fuel. A pilot fuel jet emanating from the fuel injector splits upon impacting the protuberance forming at least a first pilot fuel plume and a second pilot fuel plume. The first pilot fuel plume is redirected towards the first mixing zone and the second pilot fuel plume is redirected towards the second mixing zone.

In another preferred embodiment, there can be separate fuel injectors, a first fuel injector for gaseous fuel and a second fuel injector configured to introduce a pilot fuel into the combustion chamber. A pilot fuel jet emanating from the second fuel injector splits upon impacting the protuberance forming at least a first pilot fuel plume and a second pilot fuel plume. The first pilot fuel plume is redirected towards the first mixing zone and the second pilot fuel plume is redirected towards the second mixing zone.

Instead of using a pilot fuel the ignition source can be a positive ignition source. The positive ignition source can be one of a spark igniter, a microwave ignition apparatus and a laser igniter. The bore diameter of the combustion chamber is not limited to a particular range. Bore diameters used in light, medium and heavy duty applications as well has high horse power applications can be employed with the techniques taught herein. Nevertheless, in a preferred embodiment the bore size is less than 180 mm.

The illustrated schematic views are not drawn to scale, and some components may be drawn larger or more prominent in the figures to better illustrate the features of the disclosed apparatus.

DETAILED DESCRIPTION

Figure 2:
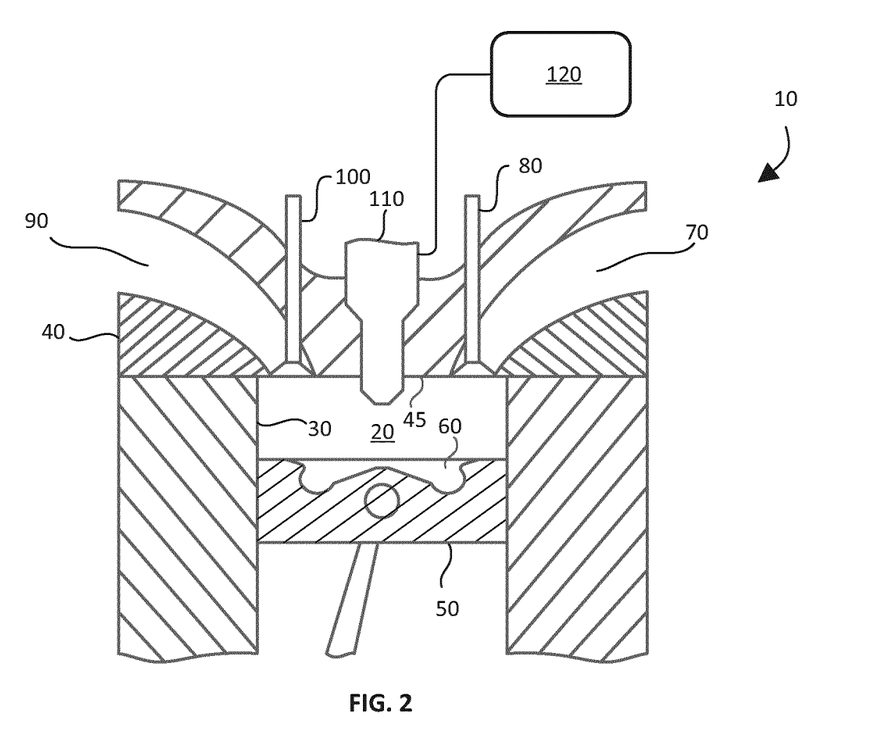
FIG. 2 is a simplified cross-sectional schematic view of an engine according to one embodiment.

Referring to FIG. 2, there is shown gaseous fueled internal combustion engine 10 in simplified form to facilitate the understanding of the present technique. Engine 10 is shown with one cylinder in this embodiment, and in other embodiments there can be more than one cylinder. Combustion chamber 20 is formed by cylinder wall 30, cylinder head 40 and piston 50 that reciprocates within the cylinder. Cylinder wall 30 forms a bore that can be any size (diameter) suitable for internal combustion engines. For example, in light duty engine applications the bore size is typically less than 100 mm, in medium and heavy duty engine applications the bore size can range from 100 mm to 180 mm, and in high horse power engine applications the bore size is above 180 mm. Generally, as the bore size increases the maximum engine speed decreases, primarily due to the increase in momentum of the piston that accompanies increases in its mass and speed putting increased stress on engine components, as would be known by those skilled in the technology. Piston 50 comprises a re-entrant type piston bowl 60 in its crown that will be discussed in more detail below. An air handling system comprises intake port 70 and intake valve 80, which are configured to cooperate with cylinder 30, cylinder head 40 and piston 50 to make combustion chamber 20 quiescent. As used herein a quiescent combustion chamber refers to a combustion chamber in which there is negligible swirl of an intake charge therein, and preferably none, and is defined to have a swirl number within the range of 0 to 0.5. The air handling system further comprises exhaust port 90 and exhaust valve 100, and, as would be known to those familiar with the technology, other components common in air handling systems that are not illustrated in the figures. At the top dead center (TDC) position, there is a small gap between the top of piston 50 and fire deck 45. At this position with some embodiments valves 80 and 100 can be aligned with recessed portions (not shown) in piston 50 so that the valves can be in an open position without interference with the piston.

Fuel injector 110 is shown mounted in cylinder head 40 and introduces gaseous fuel directly into combustion chamber 20. Although injector 110 is shown centrally mounted, it is possible that the injector can be mounted offset from the longitudinal axis of the cylinder, or mounted in cylinder wall 30 instead of cylinder head 40 in other embodiments. That is, this specific location of the fuel injector is not essential to the disclosed apparatus, and the mounting location can be determined by the specific architecture of an engine and the available space. In preferred embodiments, injector 110 further introduces a pilot fuel, such as diesel, into combustion chamber 20, which is compression ignitable due to the temperature and pressure created during the compression stroke of piston 50. The pilot fuel acts as a high energy ignition source to ignite the gaseous fuel. In the example embodiment fuel injector 110 is a concentric needle fuel injector that can introduce pilot fuel separately and independently of gaseous fuel. In an alternative arrangement, fuel injector 110 can comprise one body with side-by-side gaseous fuel and pilot fuel injection assemblies. In other embodiments an additional fuel injector separate from fuel injector 110 can be employed to introduce the pilot fuel. Controller 120 is operatively connected with injector 110 to actuate the injector to introduce the gaseous and pilot fuel into combustion chamber 20. Injector 110 is actuatable to introduce the pilot fuel independently and separately from the gaseous fuel, and the timing of the injections of pilot fuel and gaseous fuel are determined based on engine operating conditions and may or may not overlap. In other embodiments the gaseous fuel can be ignited by a positive ignition source, such as a spark plug, a microwave ignition apparatus and a laser igniter.

Figure 3:
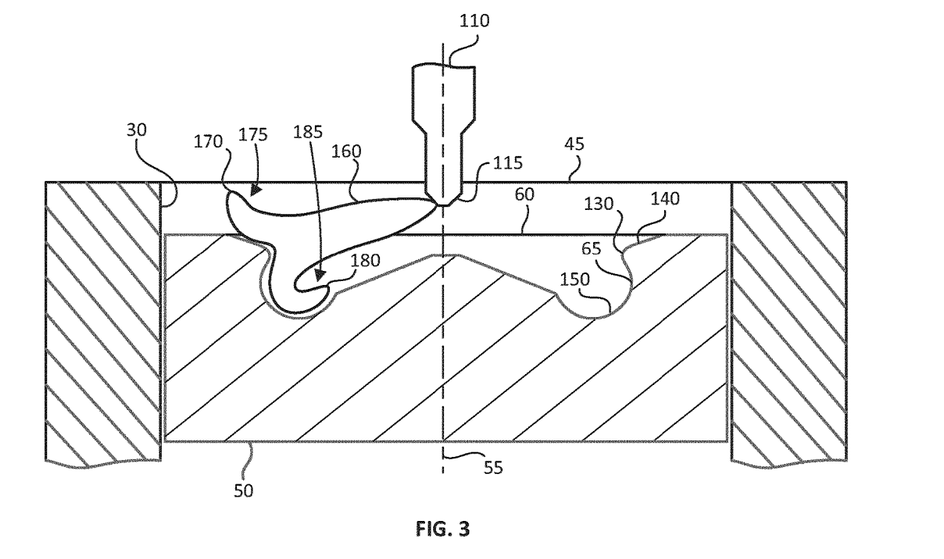
FIG. 3 is a simplified cross-sectional schematic view of the engine of FIG. 2 illustrating splitting of a gaseous fuel jet. To simplify the illustration only one fuel jet is shown.
Figure 5:
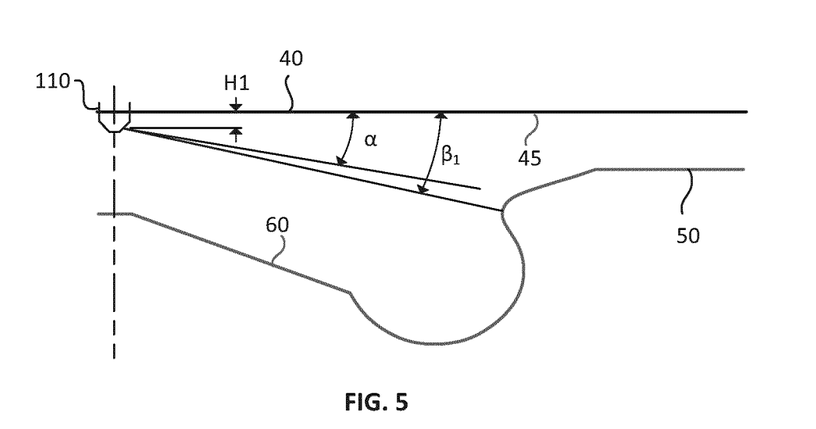
FIG. 5 is a simplified cross-sectional schematic view of the engine of FIG. 2 illustrating injection angle of the gaseous fuel jet and the mean angular location of a splitting feature in a bowl of a piston at a first crank angle.
Figure 6:
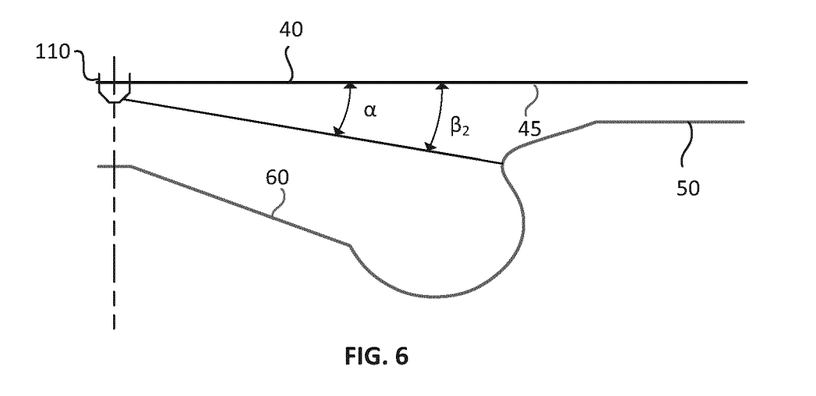
FIG. 6 is a simplified cross-sectional schematic view of the engine of FIG. 5 illustrating the mean angular location of the splitting feature when the piston is at a second crank angle.
Figure 7:
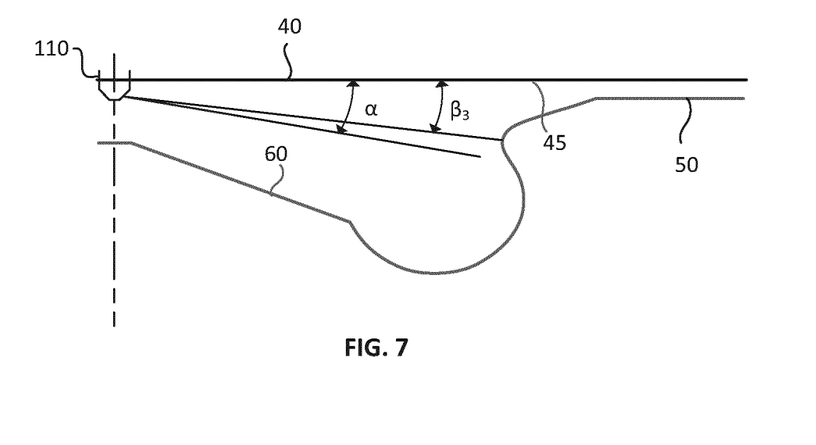
FIG. 7 is a simplified cross-sectional schematic view of the engine of FIG. 5 illustrating the mean angular location of the splitting feature when the piston is at a third crank angle.

Referring now to FIG. 3 piston bowl 60 comprises protuberance 130 emanating from outer periphery 65 and co-formed with chamfered surface 140 and re-entrant portion 150, all of which extend annularly around longitudinal axis 55 of piston 50. Protuberance 130 is a splitting feature and operates to split fuel jet 160 into two or more smaller jets or plumes and to direct these plumes towards mixing zones where the fuel can mix with the intake charge in combustion chamber 20. In a preferred embodiment fuel jet 160 is split into two plumes. During the compression and/or power stroke of engine 10, controller 120 actuates injector 110 to introduce fuel into combustion chamber 20 forming gaseous fuel jet 160 emanating from an orifice (not shown) in nozzle 115 of the injector. Although only one jet is shown for illustrative purposes it would be understood by those familiar with the technology that there are preferably more fuel jets emanating from nozzle 115 so that the whole combustion chamber volume is utilized. The timing of an exemplary start of injection is such that as piston 50 approaches TDC during the compression stroke, jet 160 impinges on protuberance 130 and bifurcates forming plume 170 and plume 180. Due to the reciprocal nature of piston 50, as the piston approaches TDC it begins to decelerate until it comes momentarily to a full stop at TDC, after which it begins to accelerate in the opposite direction towards bottom dead center (BDC). For a range of crank angles around TDC the piston velocity is relatively slow thereby providing a range of start of injection timings before and after TDC such that fuel jet 160 can impinge protuberance 130 such that it splits into two or more plumes. Referring to FIGS. 5, 6 and 7, fuel jet 160 is injected with a fixed injection angle $\alpha$ for any crank angle position of piston 50. The mean angular location of protuberance 130 changes depending upon the crank angle position of piston 50, and as the piston travels closer to TDC as illustrated progressively from FIG. 5 to FIG. 6 to the TDC position at FIG. 7, mean angle $\beta$ representing the mean angular location of protuberance 130 decreases such that $\beta_1 > \beta_2 > \beta_3$. For the range of crank angle degrees representing the movement of piston 50 between FIGS. 5 and 7, fuel jet 160 bifurcates into plumes 170 and 180, seen in FIG. 3. In a preferred embodiment for single pulse injections the introduction of fuel jet 160 is timed such that the jet can impact protuberance 130 between 15° before top dead center during the compression stroke and 15° after top dead center during the power stroke, and when split injections are employed the range can be between 30° before TDC in the compression stroke and 30° after TDC in the power stroke. This range of crank angle degrees is increased compared to liquid fuel jets due to the expanding nature of gaseous fuel jets as they exit nozzle 115, and a comparison between liquid fuel jets and gaseous fuel jets is illustratively presented by fuel jet 160 in FIG. 3 and fuel jet 161 in FIG. 4. Outside this crank angle range fuel jet 160 does not sufficiently split and plumes 170 and 180 do not sufficiently get redirected towards mixing zones 175 and 185, seen in FIG. 3, as will be explained in more detail below.

Figure 8:
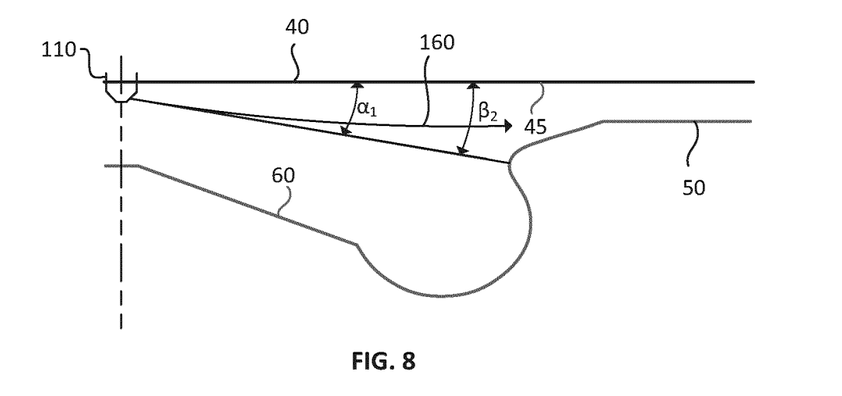
FIG. 8 is a simplified cross-sectional schematic view of the engine of FIG. 2 illustrating a fixed piston position and a gaseous fuel jet injection angle equal to a splitting feature angle representing the mean angular location of the splitting feature such that the gaseous fuel jet does not impact the mean angular location of the splitting feature due to hydrodynamic effects of boundary layer flow.
Figure 9:
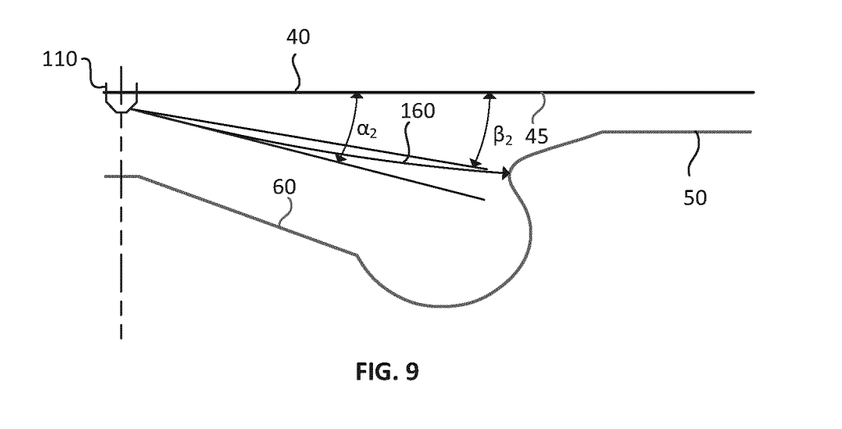
FIG. 9 is a simplified cross-sectional schematic view of the engine of FIG. 8 illustrating the fixed piston position and the same splitting feature angle and a corrected gaseous fuel jet injection angle comprising a correction for hydrodynamic effects of boundary layer flow such that the gaseous fuel jet impacts the splitting feature.

Referring now to FIGS. 8 and 9, fuel jet 160 drifts towards fire deck 45 as it penetrates into combustion chamber 20 due to the hydrodynamic effect of boundary layer flow between the jet and the fire deck. A correction in injection angle $\alpha$ is required to compensate for this effect such that the jet impacts at the intended location on protuberance 130. In FIG. 8, piston 50 is illustrated in a fixed position for the purpose of explaining the boundary effect where injection angle $\alpha_1$ equals mean angle $\beta_2$ of protuberance 130. As fuel jet 160 reaches protuberance 130 it has drifted towards fire deck 45, due to the boundary effect between the jet and the fire deck, such that it does not impact the mean location of the protuberance. In FIG. 9, piston 50 is shown in the same fixed position and the injection angle for fuel jet 160 has been increased to $\alpha 2$ such that as the fuel jet reaches protuberance 130 it impacts at the intended location. Correction angle $\alpha_c$ (not shown explicitly in the figures) in the injection angle is equal to the difference between $\alpha 2$ and $\alpha 1$, as illustrated in Equation 1 below. Compared to liquid fuel jets, which are introduced with much greater injection pressure compared to gaseous fuel jets and which atomize as they penetrate into the combustion chamber such that the hydrodynamic effect of boundary layer flow has substantially less influence on the trajectory of the liquid fuel jet, without compensating for the hydrodynamic effect gaseous fuel jets will veer off the intended course and miss the intended target.

$$\alpha_c = \alpha_2 - \alpha_1 \quad \text{Equation 1}$$

Returning to FIG. 3, the momentum of jet 160 forces plume 170 into chamfered surface 140 deflecting it towards fire deck 45 and mixing zone 175. As a result, plume 170 interacts with fire deck 45 before interaction with cylinder wall 30. Plume 180 is directed away from protuberance 130 into and around re-entrant portion 150 and back towards injector 110 and mixing zone 185. In this manner it is known that plume 180 re-enters combustion chamber 20. Protuberance 130 aids in the mixing of gaseous fuel in combustion chamber 20 by directing fuel 160 towards two or more mixing zones away from cylinder wall 30 where the gaseous fuel can mix with air in the intake charge. This technique is especially important at the relatively low fuel injection pressures characteristic of gaseous fuels, compared to liquid fuel injection pressures. In those engine operating conditions where gaseous fuel injection pressure is at a minimum, for example in engine applications utilizing variable gaseous fuel injection pressure, protuberance 130 plays an even more crucial role in increasing the mixing of gaseous fuel and air. Gaseous fuel jets have less momentum than liquid fuel jets and require a feature such as protuberance 130 in piston bowl 60 to aid in turning the gaseous fuel jets around and/or directing them towards mixing zones. The gaseous fuel in mixing zones 175 and 185 is ignited due to the combustion of pilot fuel in this embodiment. In other embodiments the gaseous fuel can be ignited in a variety of different ways, including by a positive ignition source, such as for example a spark plug, a microwave ignition apparatus, a heated surface and a laser igniter.

Figure 4:
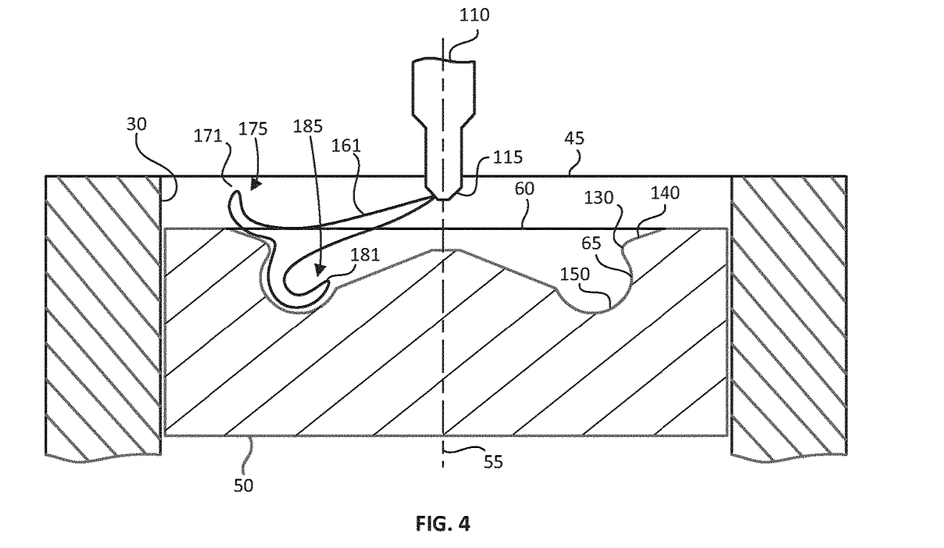
FIG. 4 is a simplified cross-sectional schematic view of the engine of FIG. 2 illustrating splitting of a pilot fuel jet. Only one fuel jet is shown for illustrative purposes.

With reference to FIG. 4, pilot jet 161 can similarly be directed towards protuberance 130 where it bifurcates into plumes 171, directed towards mixing zone 175, and plume 181, directed towards mixing zone 185. The need to mix the pilot fuel is not as important as it is for the gaseous fuel since the relative quantity of pilot fuel introduced is much less than gaseous fuel. It is possible that the pilot fuel combusts before it reaches protuberance 130 depending upon the compression ratios employed, the engine operating conditions and the quantity and type of pilot fuel introduced. However, in some circumstances the relative quantity of pilot fuel that is introduced may increase, such as when the quantity of gaseous fuel available decreases below a predetermined limit, or when the engine is operating only on pilot fuel. For example, in engines that employ diesel as the pilot fuel there is an operating mode called "run on diesel" (ROD)

in which only pilot fuel is consumed by the engine. In at least these circumstances, when the mass of pilot fuel introduced is above a predetermined quantity, it is beneficial to split pilot fuel jet 161 by way of protuberance 130 to increase the mixing of the pilot fuel with air in the intake charge in combustion chamber 20 to improve combustion.

Under low fueling conditions there can be problems with over leaning of fuel in combustion chamber 20 leading to reduced combustion performance. In such conditions, the timing for introducing fuel jet 160 can be adjusted whereby when the fuel jet is injected with injection angle α it is injected at a time when the jet impacts mainly below protuberance 130 so that the fuel is guided mainly towards mixing zone 185 (the bowl region). Accordingly, with this method, under these conditions there is less splitting and preferably no splitting of fuel jet 160 to prevent over-leaning. With this embodiment of the method, when switching from a low fueling condition to a higher fueling condition, the timing for introducing fuel jet 160 is adjusted to a time when the fuel jet's impact is centered on protuberance 130 so the fuel is guided to both mixing zones 175 and 185.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for combusting a gaseous fuel in a combustion chamber of an internal combustion engine comprising:
   introducing an intake charge into said combustion chamber with a swirl number within a range of 0 to 0.5;
   introducing a gaseous fuel jet directly into said combustion chamber;
   igniting said gaseous fuel; and
   when under high load conditions:
   splitting said gaseous fuel jet into at least a first fuel plume and a second fuel plume;
   redirecting said first fuel plume towards a first mixing zone adjacent a cylinder head; and
   redirecting said second fuel plume towards a second mixing zone adjacent a piston bowl; and
   when under light load conditions:
   guiding said gaseous fuel jet towards said second mixing zone.

2. The method of claim 1, further comprising introducing a pilot fuel jet directly into said combustion chamber whereby said pilot fuel jet compression ignites thereby igniting said gaseous fuel.

3. The method of claim 2, further comprising at least one of:
   introducing said pilot fuel jet into said combustion chamber before said gaseous fuel jet; and
   introducing said pilot jet with a pilot fuel injection angle less than a gaseous fuel injection angle.

4. The method of claim 1, further comprising an operating mode comprising:
   fueling said internal combustion engine only with a pilot fuel;
   introducing a pilot fuel jet directly into said combustion chamber;
   splitting said pilot fuel jet into at least a first pilot fuel plume and a second pilot fuel plume;
   redirecting said first pilot fuel plume towards said first mixing zone;
   redirecting said second pilot fuel plume towards second mixing zone; and
   compression igniting said first and second pilot fuel plumes.

5. The method of claim 1, wherein a positive ignition source ignites said gaseous fuel.

6. The method of claim 1, wherein said gaseous fuel jet is split when said piston is between at least one of:
   a range of 15° before top dead center during a compression stroke and 15° after top dead center during a power stroke; and
   a range of 30° before top dead center during a compression stroke and 30° after top dead center during a power stroke.

7. The method of claim 1, wherein said gaseous fuel is selected from the list containing biogas, butane, ethane, hydrogen, methane, propane, natural gas and mixtures of these fuels.

8. The method of claim 1, further comprising during a high fueling condition:
   performing a first gaseous fuel injection such that gaseous fuel is primarily directed towards said first mixing zone; and
   performing a second gaseous fuel injection such that gaseous fuel is primarily directed towards said second mixing zone.

9. A method for combusting a gaseous fuel in a combustion chamber of an internal combustion engine comprising:
   introducing an intake charge into said combustion chamber with a swirl number within a range of 0 to 0.5;
   introducing a gaseous fuel jet directly into said combustion chamber;
   igniting said gaseous fuel; and
   when under high load conditions,
   splitting said gaseous fuel jet into at least a first fuel plume and a second fuel plume;
   redirecting said first fuel plume towards a first mixing zone adjacent a cylinder head; and
   redirecting said second fuel plume towards a second mixing zone adjacent a piston bowl; or
   when under light load conditions:
   guiding said gaseous fuel jet towards said second mixing zone, wherein an injection angle of said gaseous fuel jet comprises a correction angle to compensate for the hydrodynamic effect of boundary layer flow between said gaseous fuel jet and a fire deck of said combustion chamber such that said gaseous fuel jet impacts a splitting feature within a predetermined range of tolerance.

10. A combustion system for an internal combustion engine comprising:
    a combustion chamber defined in part by a cylinder wall and a cylinder head;
    a piston further defining said combustion chamber and comprising a re-entrant piston bowl reciprocating within said cylinder wall, said re-entrant piston bowl comprising an outer periphery and a protuberance emanating from said outer periphery;
    an intake port;
    an intake valve allows selective communication of an intake charge from said intake port to said combustion chamber, said intake port, said intake valve and said piston cooperating to introduce said intake charge quiescently into said combustion chamber with a swirl number within a range of 0 to 0.5;
    a fuel injector configured to directly introduce a gaseous fuel into said combustion chamber;
    an ignition source for igniting said gaseous fuel; and a controller operatively connected with said fuel injector and programmed to actuate said fuel injector to introduce said gaseous fuel into said combustion chamber;

wherein when under high load conditions the controller is adjusted so that a gaseous fuel jet emanating from said fuel injector ignites and is directed towards and splits upon impacting said protuberance forming at least a first fuel plume and a second fuel plume, said first fuel plume redirected towards a first mixing zone adjacent said cylinder head and said second fuel plume redirected towards a second mixing zone adjacent said piston bowl; and wherein when under light load conditions the controller is adjusted so that said gaseous fuel jet emanating from said fuel injector is guided by said protuberance towards said second mixing zone.

11. The combustion system of claim 10, wherein said fuel injector is a concentric needle fuel injector configured to introduce said gaseous fuel and a pilot fuel.

12. The combustion system of claim 11, wherein start of injection timing for said pilot fuel is earlier than start of injection timing for said gaseous fuel.

13. The combustion system of claim 11, wherein a gaseous fuel jet injection angle is greater than a pilot fuel jet injection angle.

14. The combustion system of claim 11, said controller further programmed to introduce only said pilot fuel into said combustion chamber when at least one of (1) said gaseous fuel pressure drops below a predetermined value and (2) a quantity of gaseous fuel drops below a predetermined value, such that said internal combustion engine is fueled with only said pilot fuel, and wherein a pilot fuel jet emanating from said fuel injector splits upon impacting said protuberance forming at least a first pilot fuel plume and a second pilot fuel plume, said first pilot fuel plume redirected towards said first mixing zone and said second pilot fuel plume redirected towards said second mixing zone.

15. The combustion system of claim 10, wherein said combustion chamber comprises a bore size less than 180 mm.

16. The combustion system of claim 10, wherein during a high fueling condition said controller further programmed to:
 perform a first gaseous fuel injection such that gaseous fuel is primarily directed towards said first mixing zone; and
 perform a second gaseous fuel injection such that gaseous fuel is primarily directed towards said second mixing zone.

17. A combustion system for an internal combustion engine comprising:
 a combustion chamber defined in part by a cylinder wall and a cylinder head;
 a piston further defining said combustion chamber and comprising a re-entrant piston bowl reciprocating within said cylinder wall, said re-entrant piston bowl comprising an outer periphery and a protuberance emanating from said outer periphery;
 an intake port;
 an intake valve allows selective communication of an intake charge from said intake port to said combustion chamber, said intake port, said intake valve and said piston cooperating to introduce said intake charge quiescently into said combustion chamber with a swirl number within a range of 0 to 0.5;
 a fuel injector configured to directly introduce a gaseous fuel into said combustion chamber;
 an ignition source for igniting said gaseous fuel; and
 a controller operatively connected with said fuel injector and programmed to actuate said fuel injector to introduce said gaseous fuel into said combustion chamber;
 wherein when under high load conditions the controller is adjusted so that a gaseous fuel jet emanating from said fuel injector ignites and is directed towards and splits upon impacting said protuberance forming at least a first fuel plume and a second fuel plume, said first fuel plume redirected towards a first mixing zone adjacent said cylinder head and said second fuel plume redirected towards a second mixing zone adjacent said piston bowl; or
 wherein when under light load conditions the controller is adjusted so that said gaseous fuel jet emanating from said fuel injector is guided by said protuberance towards said second mixing zone; and
 wherein said fuel injector is configured to introduce said gaseous fuel jet at an injection angle comprising a correction angle to compensate for the hydrodynamic effect of boundary layer flow between said gaseous fuel jet and a fire deck of said combustion chamber such that said gaseous fuel jet impacts a splitting feature within a predetermined range of tolerance.

18. A combustion system for an internal combustion engine comprising:
 a combustion chamber defined in part by a cylinder wall and a cylinder head;
 a piston further defining said combustion chamber and comprising a re-entrant piston bowl reciprocating within said cylinder wall, said re-entrant piston bowl comprising an outer periphery and a protuberance emanating from said outer periphery;
 an intake port;
 an intake valve allows selective communication of an intake charge from said intake port to said combustion chamber, said intake port, said intake valve and said piston cooperating to introduce said intake charge quiescently into said combustion chamber with a swirl number within a range of 0 to 0.5;
 a fuel injector configured to directly introduce a gaseous fuel into said combustion chamber;
 an ignition source for igniting said gaseous fuel,
 a controller operatively connected with said fuel injector and programmed to actuate said fuel injector to introduce said gaseous fuel into said combustion chamber; and
 a second fuel injector configured to introduce a pilot fuel into said combustion chamber;
 wherein when under high load conditions the controller is adjusted so that a gaseous fuel jet emanating from said fuel injector ignites and is directed towards and splits upon impacting said protuberance forming at least a first fuel plume and a second fuel plume, said first fuel plume redirected towards a first mixing zone adjacent said cylinder head and said second fuel plume redirected towards a second mixing zone adjacent said piston bowl; or
 wherein when under light load conditions the controller is adjusted so that said gaseous fuel jet emanating from said fuel injector is guided by said protuberance towards said second mixing zone.

19. The combustion system of claim 18, a pilot fuel jet emanating from said second fuel injector splits upon impacting said protuberance forming at least a first pilot fuel plume and a second pilot fuel flume, said first pilot fuel plume redirected towards said first mixing zone and said second pilot fuel plume redirected towards said second mixing zone.

20. The combustion system of claim 19, wherein said ignition source is one of a spark igniter, a microwave ignition apparatus and a laser igniter.

* * * * *